Aug. 20, 1940.  H. R. RICARDO ET AL  2,212,186
FLUID FLOW METER
Filed March 29, 1937
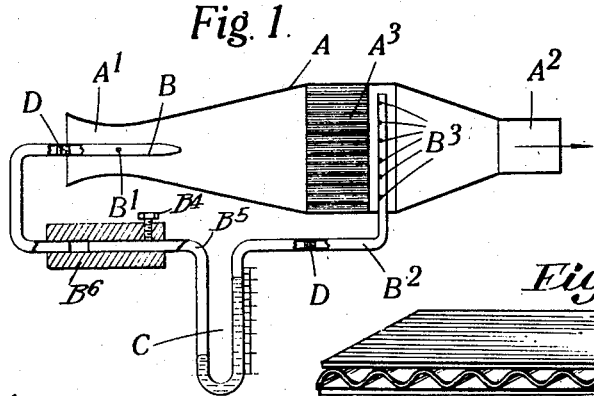
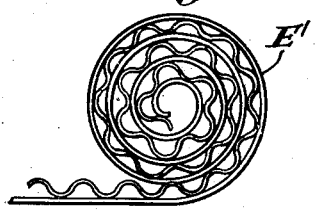
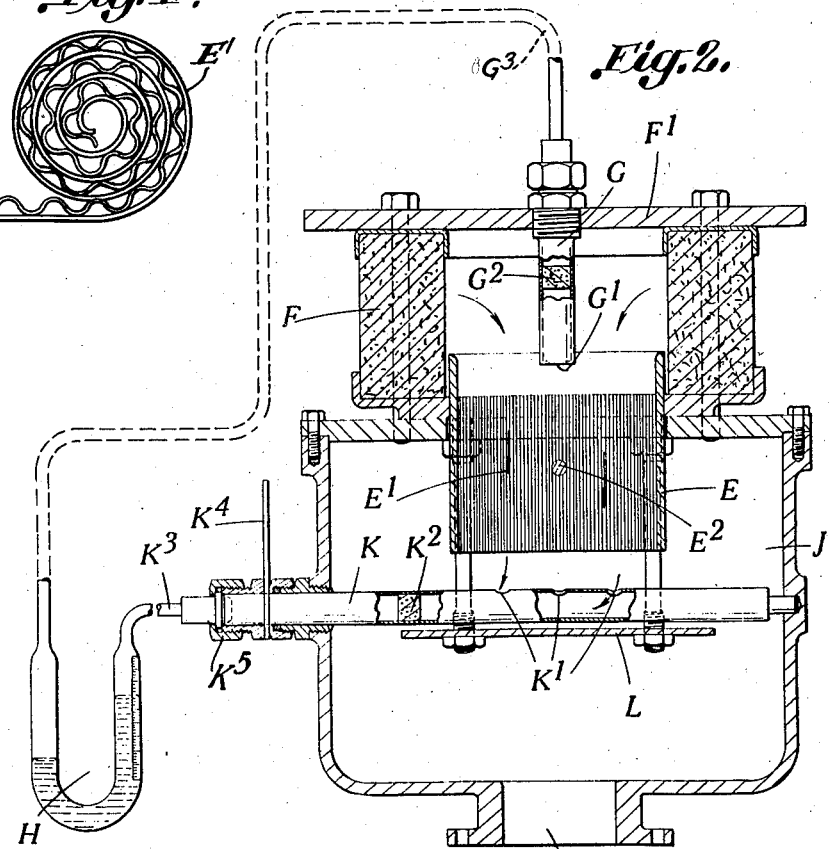

Patented Aug. 20, 1940

2,212,186

UNITED STATES PATENT OFFICE 2,212,186

FLUID FLOW METER

Harry Ralph Ricardo, London, and John Forster Alcock, Lancing, England; said Alcock assignor to said Ricardo Application March 29, 1937, Serial No. 133,678
In Great Britain April 6, 1936

13 Claims. (Cl. 73—205)

This invention relates to fluid flow meters for indicating the rate of fluid flow through a passage and has for its object to provide an improved fluid flow meter more particularly intended for measuring the mean rate of flow where the fluid flow is of a pulsating character.

With known meters such as meters of the orifice or Venturi type which operate by measuring kinetic pressure difference which is caused in some way by what may be termed a kinetic device by the flow and is dependent upon the rate of flow, the kinetic pressures are proportional to the square of the rate of flow. Thus, with such known meters, if the flow is pulsating, the meter indicates the mean of the square roots of the various rates of flow constituting the pulsating flow and not the square root of the mean rate of flow. In addition, with a pulsating flow the pressure difference is also pulsating and this causes pulsating flow into and out of the pipes connected to the manometer or other device for measuring the pressure difference and if to obtain a steady reading this flow is also throttled by a kinetic throttling device, this may under certain conditions also cause errors in the reading of the manometer.

A fluid flow meter according to the present invention comprises a passage through which the flow to be measured takes place having within it a main viscous resistance element, that is to say an element comprising one or more long narrow passages so proportioned that the resistance to flow through the device is under normal working conditions substantially proportional to the rate of flow, a manometer or other device for measuring pressure difference connected to the passage respectively on the two sides of the main viscous resistance element so as to measure the pressure difference caused by the flow through this element, and a subsidiary viscous resistance element inserted in one or each of the connections between the manometer or the like and the passage. Each subsidiary viscous resistance element should offer such frictional resistance to flow as to render negligible any kinetic or non-linear resistances within its connection.

Where a fluid flow meter according to the invention is required to deal with a large volume of fluid it will usually be inconvenient to make the passage and the main viscous resistance element of such size as to avoid any appreciable difference in kinetic pressure on the two sides of the resistance element due to the passage of fluid through such element and, according to a further feature of the present invention, the means for connecting the manometer or like device to the passage on one or each side of the main viscous resistance element may be such that the kinetic effect of the flow modifies the pressure difference in the two connections to the manometer or the like to counterbalance partially or wholly the effect on the manometer of any kinetic pressure difference produced on the two sides of the main viscous resistance element due to the passage of fluid through such element.

Thus, for the purpose of wholly or partially counteracting the effect on the manometer or the like of any kinetic pressure differences developed on the two sides of the main viscous resistance element due to the flow of air therethrough, the connection between the manometer and the part of the passage on the downstream side of the main viscous resistance element may be arranged so that the opening or openings leading into such connection face upstream and those in the upstream connection face downstream. Again, the connection between the manometer or the like and the part of the passage on the upstream side of the main viscous resistance element may be arranged so that the opening or openings through which this connection communicates with the passage lie in a venturi in such passage for the purpose of partially or wholly counteracting the effect on the manometer or the like of any kinetic pressure differences developed on the two sides of the main viscous resistance element due to the flow therethrough.

In some cases a combination of the above two arrangements for reducing or eliminating the effect of kinetic pressure differences on the two sides of the main viscous resistance element may be employed.

The construction of the main viscous resistance element and of the subsidiary viscous resistance element or elements may vary but in one arrangement the main viscous resistance element is composed of alternate layers of corrugated and uncorrugated strip material arranged face to face and in contact with one another so as to provide a series of fine parallel passages while each subsidiary viscous resistance element may comprise a pad of closely packed felt.

Convenient proportions for the sheets of material forming a main viscous resistance element constructed as above described where this is to deal with a flow velocity of about thirty feet per second of atmospheric air are:

|  | Inches |
|---|---|
| Width of each sheet, that is to say the length of each triangular passage formed by a corrugation in one sheet and the plane face of an adjacent sheet | 3 |
| Thickness of each sheet | .0017 |
| Depth of each corrugation in the corrugated sheets, that is to say height of each triangular passage | Approximately .017 |

It will be understood that the alternate layers of corrugated and uncorrugated strip material may be formed into a viscous resistance element in various ways. For example, they may be formed as separate sheets of material pressed together and arranged in a main passage of rectangular crosssection or may be formed by a strip of corrugated material and a strip of plane material placed face to face and rolled up to form a viscous resistance element of circular crosssection adapted to be disposed in a correspondingly formed main passage, or in some other way.

The invention may be carried into practice in various ways but two constructions according to the invention are illustrated by way of example in the accompanying drawing, in which Figure 1 is a sectional side elevation showing diagrammatically one construction according to the invention, and Figure 2 is a sectional side elevation showing in more detail another construction according to the invention.

Figure 3 is a detailed cross-sectional view of the alternate layers of corrugated and uncorrugated sheets of which the main viscous resistance element may be composed, the depth of the corrugations and thickness of the layers being considerably enlarged to facilitate illustration.

Figure 4 is a similar view illustrating the method of formation of a modified resistance element in which the layers are spirally wound.

In the construction diagrammatically illustrated in Figure 1, the apparatus comprises a tubular casing A having inflow and outflow openings $A^1$, $A^2$, the inflow opening $A^1$ being in the form of a venturi. Extending across the casing A at an intermediate point in its length is a main viscose resistance element $A^3$ composed for example of alternate layers of corrugated and uncorrugated strip material arranged face to face and in contact with one another so as to provide a series of fine parallel passages of triangular cross-section, the depth of each corrugation being, for example, approximately .017 inches.

Arranged in the inlet opening $A^1$ is a pipe B communicating with the inlet opening through an aperture $B^1$ and with a fixed pipe $B^5$ leading to one side of a manometer C through a connecting sleeve $B^6$ surrounding the adjacent ends of the pipes B and $B^5$. The pipe B is sealed in the sleeve $B^6$ which can slide over the fixed pipe $B^5$ so as to adjust the position of the aperture $B^1$ in the Venturi-shaped inlet $A^1$ and when so adjusted can be fixed in position by a screw $B^4$. Leading to the other side of the manometer C is a passage $B^2$ the free end of which extends into the casing A on the downstream side of the main viscous resistance element $A^3$ and is provided with a series of apertures $B^3$ facing the direction from which fluid flows through the casing A. Subsidiary viscous resistance elements D, in the form, for example, of pads of felt, are arranged in the two passages B, $B^2$, as shown.

The direction of fluid flow through the casing A is that indicated by the arrow and the arrangement is such that under normal conditions of flow, while the main viscous resistance element $A^3$ is such that the resistance to flow therethrough is approximately proportional to the rate of flow, there is a small kinetic pressure difference produced on the two sides of the main viscous resistance element due to the passage of fluid through such element. The dimensions of the Venturi-shaped inlet opening $A^1$, the position of the aperture $B^1$ and the disposition of the holes $B^3$ are such as substantially to eliminate the effect on the manometer of any such kinetic pressure difference so that the manometer reading is always substantially proportional to the mean rate of flow.

In the alternative construction illustrated in Figure 2, which is suitable for application, for example, to the end of the induction pipe of an internal combustion engine, the meter comprises a main passage E through which the air flow to be measured takes place, this main passage forming the outer wall of a viscous resistance element $E^1$ constructed as a pack of alternate sheets of plain and corrugated sheet material. Two suitable methods of disposing the alternate sheets are illustrated in Figures 3 and 4, Figure 3 showing separate sheets of corrugated and uncorrugated material disposed face to face, and Figure 4 showing the method of rolling the sheets spirally on one another. It will be appreciated that the proportion of depth of the corrugations has been exaggerated in these figures to clarify the illustration. In either construction the several sheets may be provided, if desired, with one or more stay-rods, as indicated at $E^2$ in Figure 2, passing through it for strengthening purposes. Such stay-rods when provided may be inserted into holes drilled through the pack of sheets after assembly and riveted over at their ends. Arranged on the inlet side of the main passage E is an air filter F of annular form adapted to clean the air, this filter being secured in place by an end plate $F^1$ into which is screwed a tubular connecting member G having its open end $G^1$ lying within the mouth of the main passage E. Arranged within the tubular connecting member G is a pad of felt $G^2$ constituting a subsidiary resistance element, while connected to the outer end of the tubular element G is a pipe $G^3$ leading to one side of a manometer H.

The downstream end of the main passage E opens into a chamber J from which air is adapted to be drawn by the internal combustion engine through an opening $J^1$ and extending across this chamber so as to lie in the path of the air issuing from the main passage E is a tube K having its free end closed and one or more holes $K^1$ facing the outlet end of the main passage E. Arranged in this tube K at a point on the side of the hole or holes $K^1$ remote from the closed end is a felt pad $K^2$ constituting a second subsidiary viscous resistance element, the tube being connected by a suitable pipe $K^3$ to the other side of the manometer H. Arranged immediately on the side of the tube K remote from the main passage E is a plate L.

The tube K can be rocked about its longitudinal axis by means of a lever $K^4$ and locked in any desired rotational position, for example by tightening the nut $K^5$.

In the construction illustrated in Figure 2, the main viscous resistance element $E^1$ is so constructed in relation to the normal rate of flow of air therethrough that the frictional resistance to flow therethrough is approximately proportional to the rate of this flow. The effect on the manometer of any differences in kinetic pressure on the two sides of the main viscous resistance element due to the flow therethrough is substantially counteracted by the arrangement of the holes $K^1$ facing the direction from which the air flowing through the main viscous resistance element approaches them. It will be understood that by adjusting the rotational position of the tube K or the axial position of the tube G to the required extent adjustment can be made of the correction thus imposed upon the reading of the manometer so as to render this reading substantially unaffected by differences in kinetic pressure on the two sides of the main viscous resistance element and thus give a true reading as if the frictional resistance to flow through the main viscous resistance element were in truth exactly proportional to the mean rate of flow therethrough under the prevailing conditions.

What we claim as our invention and desire to secure by Letters Patent is:

1. A fluid flow meter comprising a passage through which the flow to be measured takes place, a main viscous resistance element in the passage, a device for measuring pressure difference, connections connecting the said device to the pasage respectively on the two sides of the main viscous resistance element so as to measure the pressure difference caused by the flow through this element, and a subsidiary viscous resistance element inserted in at least one of the connections between the pressure difference measuring device and the passage and substantially eliminating the effect of kinetic resistance in its connection.

2. A fluid flow meter comprising a passage through which the flow to be measured takes place, a main viscous resistance element in the passage, a device for measuring pressure difference, connections connecting the said device to the passage respectively on the two sides of the main viscous resistance element so as to measure the pressure difference caused by the flow through this element, and a subsidiary viscous resistance element inserted in at least one of the connections between the pressure difference measuring device and the passage, the connection for connecting the pressure difference measuring device to the passage on at least one side of the main viscous resistance element having an opening into the passage situated so that the kinetic energy due to the flow modifies the pressure difference in the two connections to the pressure difference measuring device to counterbalance at least partially the effect on the pressure difference measuring device of any kinetic pressure which may be produced on the two sides of the main viscous resistance element due to the passage of the fluid through such element.

3. A fluid flow meter comprising a passage through which the flow to be measured takes place, a main viscous resistance element in the passage, a device for measuring pressure difference, connections connecting the said device to the passage respectively on the two sides of the main viscous resistance element so as to measure the pressure difference caused by the flow through this element, and a subsidiary viscous resistance element inserted in at least one of the connections between the pressure difference measuring device and the passage, the connection between the pressure difference measuring device and the part of the passage on the downstream side of the main viscous resistance element being arranged so that the entrance leading into such connection faces upstream.

4. A fluid flow meter comprising a passage through which the flow to be measured takes place, a main viscous resistance element in the passage, a device for measuring pressure difference, connections connecting the said device to the passage respectively on the two sides of the main viscous resistance element so as to measure the pressure difference caused by the flow through this element and a subsidiary viscous resistance element inserted in at least one of the connections between the pressure difference measuring device and the passage, the connection between the pressure difference measuring device and the part of the passage on the upstream side of the main viscous resistance element being arranged so that the entrance leading into such connection faces downstream.

5. A fluid flow meter comprising a passage through which the flow to be measured takes place, a main viscous resistance element in the passage, a device for measuring pressure difference, connections connecting the said device to the passage respectively on the two sides of the main viscous resistance element so as to measure the pressure difference caused by the flow through this element, a subsidiary viscous resistance element inserted in at least one of the connections between the pressure difference measuring device and the passage, and a venturi arranged in the passage on the upstream side of the main viscous resistance element with the connection between the pressure difference measuring device and the part of the passage on the upstream side of the main viscous resistance element opening into this venturi.

6. A fluid flow meter comprising a passage through which the flow to be measured takes place, a main viscous resistance element in the passage, a device for measuring pressure difference, connections connecting the said device to the passage respectively on the two sides of the main viscous resistance element so as to measure the pressure difference caused by the flow through this element, a subsidiary viscous resistance element inserted in at least one of the connections between the pressure difference measuring device and the passage, and means whereby the connection between the pressure difference measuring device and the passage on the downstream side of the main viscous resistance element can be adjusted to vary the direction in which the entrance leading into such connection faces in relation to the direction of flow in the passage.

7. A fluid flow meter comprising a passage through which the flow to be measured takes place, a main viscous resistance element in the passage, a device for measuring pressure difference, connections connecting the said device to the passage respectively on the two sides of the main viscous resistance element so as to measure the pressure difference caused by the flow through this element, a subsidiary viscous resistance element inserted in at least one of the connections between the pressure difference measuring device and the passage, a venturi arranged in the passage on the upstream side of the main viscous resistance element with the connection between the pressure difference measuring device and the part of the passage on the upstream side of the main viscous resistance element opening into this venturi, and means whereby the connection between the pressure difference measuring device and the upstream side of the main viscous resistance element can be adjusted longitudinally of the passage to enable the position of the opening through which this connection communicates with the venturi to be adjustable longitudinally of the venturi.

8. A fluid flow meter comprising a passage through which the flow to be measured takes place, a main viscous resistance element in the passage, a device for measuring the pressure difference, connections connecting the said device to the passage respectively on the two sides of the main viscous resistance element so as to measure the pressure difference caused by the flow through this element, and a subsidiary viscous resistance element inserted in at least one of the connections between the pressure difference measuring device and the passage, the connection between the pressure difference measuring device and the part of the passage on the downstream side of the main viscous resistance element comprising a tube extending across the passage and communicating with the passage through at least one aperture in its circumferential wall, and means whereby the tube can be rocked about its longitudinal axis.

9. A fluid flow meter comprising a passage through which the flow to be measured takes place, a main viscous resistance element in the passage comprising a series of alternate layers of corrugated and uncorrugated sheet material arranged face to face and in contact with one another so as to provide a series of fine parallel passages, a device for measuring pressure difference, connections connecting the said device to the passage respectively on the two sides of the main viscous resistance element so as to measure the pressure difference caused by the flow through this element, and a subsidiary viscous resistance element inserted in at least one of the connections between the pressure difference measuring device and the passage, the connection for connecting the pressure difference measuring device to the passage on at least one side of the main viscous resistance element having an opening into the passage situated so that the kinetic energy due to the flow modifies the pressure difference in the two connections to the pressure difference measuring device to counterbalance at least partially the effect on the pressure difference measuring device of any kinetic pressure which may be produced on the two sides of the main viscous resistance element due to the passage of the fluid through such element.

10. A fluid flow meter comprising a passage through which the flow to be measured takes place, a main viscous resistance element in the passage comprising a series of alternate layers of corrugated and uncorrugated sheet material arranged face to face and in contact with one another so as to provide a series of fine parallel passages, a device for measuring pressure difference, connections connecting the said device to the passage respectively on the two sides of the main viscous resistance element so as to measure the pressure difference caused by the flow through this element, a subsidiary viscous resistance element inserted in at least one of the connections between the pressure difference measuring device and the passage, the connection between the pressure difference measuring device and the part of the passage on the downstream side of the main viscous resistance element being arranged so that the entrance leading into such connection faces upstream, and means whereby the direction in which the entrance leading into such connection faces in relation to the direction of flow in the passage can be varied.

11. A fluid flow meter comprising a passage through which the flow to be measured takes place, a main viscous resistance element in the passage comprising a series of alternate layers of corrugated and uncorrugated sheet material arranged face to face and in contact with one another so as to provide a series of fine parallel passages, a device for measuring pressure difference, connections connecting the said device to the passage respectively on the two sides of the main viscous resistance element so as to measure the pressure difference caused by the flow through this element, and a subsidiary viscous resistance element inserted in at least one of the connections between the pressure difference measuring device and the passage, the connection between the pressure difference measuring device and the part of the passage on the downstream side of the main viscous resistance element comprising a tube extending across the passage and communicating with the passage through at least one aperture in its circumferential wall, and means whereby the tube can be rocked about its longitudinal axis.

12. A fluid flow meter comprising a passage through which the flow to be measured takes place, a main viscous resistance element in the passage comprising a series of alternate layers of corrugated and uncorrugated sheet material arranged face to face and in contact with one another so as to provide a series of fine parallel passages, a device for measuring pressure difference, connections connecting the said device to the passage respectively on the two sides of the main viscous resistance element so as to measure the pressure difference caused by the flow through this element, a subsidiary viscous resistance element inserted in at least one of the connections between the pressure difference measuring device and the passage, a venturi arranged in the passage on the upstream side of the main viscous resistance element with the connection between the pressure difference measuring device and the part of the passage on the upstream side of the main viscous resistance element opening into this venturi, and means whereby the connection between the pressure difference measuring device and the upstream side of the main viscous resistance element can be adjusted longitudinally of the passage to enable the position of the opening through which this connection communicates with the venturi to be adjustable longitudinally of the venturi.

13. A fluid flow meter as claimed in claim 1, in which said subsidiary viscous resistance element comprises a pad of closely packed felt.

HARRY RALPH RICARDO.
JOHN FORSTER ALCOCK.